United States Patent
Berkovitz et al.

(10) Patent No.: US 12,044,333 B2
(45) Date of Patent: Jul. 23, 2024

(54) BI-FLOW CRYOGENIC FIRESAFE FLOATING BALL VALVE

(71) Applicant: Habonim Industrial Valves & Actuators Ltd., Galil Elion (IL)

(72) Inventors: Igor Berkovitz, Karmiel (IL); Yoel Hadar, Kiryat Shmona (IL)

(73) Assignee: ITT Manufacturing Enterprises LLC, Wilmington, DE (US)

( * ) Notice: Subject to any disclaimer, the term of this patent is extended or adjusted under 35 U.S.C. 154(b) by 81 days.

(21) Appl. No.: 17/998,172

(22) PCT Filed: May 27, 2020

(86) PCT No.: PCT/IL2020/050585
§ 371 (c)(1),
(2) Date: Nov. 8, 2022

(87) PCT Pub. No.: WO2021/240494
PCT Pub. Date: Dec. 2, 2021

(65) Prior Publication Data
US 2023/0213102 A1     Jul. 6, 2023

(51) Int. Cl.
*F16K 5/06* (2006.01)
*F16K 5/02* (2006.01)
*F16K 17/06* (2006.01)

(52) U.S. Cl.
CPC .......... *F16K 5/0605* (2013.01); *F16K 5/0207* (2013.01); *F16K 17/06* (2013.01)

(58) Field of Classification Search
CPC ....... F16K 5/0605; F16K 5/0207; F16K 17/06
See application file for complete search history.

(56) References Cited

U.S. PATENT DOCUMENTS

| 10,544,868 | B2 * | 1/2020 | Bell | ................. F16K 5/0626 |
| 2009/0095931 | A1 * | 4/2009 | Stunkard | ............. F16K 5/201 |
| | | | | 251/157 |

(Continued)

FOREIGN PATENT DOCUMENTS

| CN | 202756655 | 2/2013 |
| EP | 2423549 | 2/2012 |

(Continued)

OTHER PUBLICATIONS

PCT Search Report and Written Opinion PCT/IL2020/050585, Sep. 1, 2020.

*Primary Examiner* — Kevin R Barss
(74) *Attorney, Agent, or Firm* — Dekel Patent Ltd.; David Klein (57) ABSTRACT

A floating ball valve comprising: a housing having an internal cavity and first and second fluid flow ports through which fluid flows selectively in either direction from the first to the second or the second to the first fluid flow ports when the valve is open; a floating ball housed in the cavity and formed having a through hole for passage of fluid the ball being rotatable to open the valve and allow fluid flow through the fluid flow ports and internal cavity and to close the valve and block fluid flow through the fluid flow ports and cavity; and a pressure relief valve (PRV) having a cracking pressure mounted to the floating ball so that the PRV communicates with the through hole, and when the floating ball valve is closed the PRV faces and communicates with the first fluid flow port; wherein the PRV is normally closed whether the floating ball valve is open or closed, and when the floating ball valve is closed, if pressure in the internal cavity exceeds the cracking pressure of the PRV, the PRV opens to relieve the pressure.

12 Claims, 6 Drawing Sheets

(56) References Cited

U.S. PATENT DOCUMENTS

| | | | |
|---|---|---|---|
| 2011/0260089 A1* | 10/2011 | Xu | F16K 5/204 |
| | | | 251/315.01 |
| 2015/0000768 A1 | 1/2015 | Zheng | |
| 2017/0002934 A1 | 1/2017 | Sucher | |
| 2018/0010704 A1* | 1/2018 | Mitsuoka | F16K 31/602 |
| 2018/0087675 A1* | 3/2018 | Balan | F16K 5/205 |
| 2019/0154161 A1* | 5/2019 | Kazama | F16K 5/201 |
| 2019/0368633 A1* | 12/2019 | Sandiford | F16K 5/0663 |
| 2020/0355276 A1* | 11/2020 | Berkovitz | F16K 5/205 |

FOREIGN PATENT DOCUMENTS

| | | | |
|---|---|---|---|
| EP | 3279529 A1 * | 2/2018 | F16K 25/005 |
| GB | 1346357 | 2/1974 | |
| GB | 2226385 | 6/1990 | |
| KR | 101962864 | 3/2019 | |

* cited by examiner

BI-FLOW CRYOGENIC FIRESAFE FLOATING BALL VALVE

TECHNICAL FIELD

Embodiments of the disclosure relate to floating ball valves that may operate to control flow of cryogenic fluids.

BACKGROUND

A typical conventional ball valve comprises a housing having a fluid inlet upstream port opposite a fluid outlet downstream port, and a ball having a through hole formed along a diameter of the ball that is held in an internal cavity of the housing between annular sealing gaskets, referred to as "seats". The ball may be rotated to align the through hole with the inlet and outlet ports to open the valve so that fluid may flow between the ports through the valve, and be rotated to align the through hole facing away from the ports to close the valve and block fluid flow through the valve. The ball is coupled to a shaft referred to as a stem that extends from the internal cavity of the housing to outside of the housing. Rotating the stem, typically thorough, a quarter turn of 90°, rotates the ball between open and closed orientations of the ball that respectively open and close the valve.

In a trunnion mounted ball valve, the ball is mounted to a trunnion in the housing cavity that shares a common axis of rotation with the valve stem and stabilizes the position of the ball in the cavity against displacement in directions parallel to fluid flow through the valve. In a floating ball valve, the ball is absent trunnion support and exhibits displacement parallel to direction of fluid flow, which aids in sealing the valve against fluid leakage through the valve when the valve is closed. When closing the valve, fluid pressure displaces the ball in a downstream flow direction to press the ball to the downstream seat that holds the ball and "dynamically" seal the ball to the downstream seat and thereby close and seal the valve against fluid flow.

In a cryogenic floating ball valve operated to control flow of cryogenic fluids, the ball is generally formed having a pressure release hole through which gas that evaporates from cryogenic fluid trapped in the cavity housing may escape without generating dangerous and potentially explosive gas overpressure in the valve. The valve operates to dynamically seal the ball effectively against only a given one of the seats that holds the ball. The valve is "monodirectional" and properly closes and seals to block fluid flow for only that direction of fluid flow through the valve for which the given one seat is downstream and when closed the pressure release hole faces upstream.

SUMMARY

An aspect of an embodiment of the disclosure relates to providing a firesafe bidirectional cryogenic floating ball valve operational to control fluid flow selectively in either direction of opposite directions of fluid flow through the valve between first and second fluid flow ports of the valve. For convenience of presentation, fluid flow through the valve from the first fluid flow port to the second fluid flow port may be referred to as forward flow through the valve and fluid flow through the valve from the second fluid flow port to the first fluid flow port may be referred to as backward flow through the valve. In an embodiment, the floating ball valve, optionally referred to as a Bi-Flow valve or simply Bi-Flow, comprises a floating ball having a pressure relief valve (PRV). The PRV operates as a safety valve, having a single, allowed direction for fluid flow through the PRV from an inlet of the PRV to an outlet of the PRV. The PRV is normally closed to fluid flow through the PRV in the allowed direction but is configured having a pressure relief threshold, a cracking pressure, which if exceeded opens the release valve to fluid flow through the PRV in the allowed direction of the PRV. The PRV is mounted to the floating ball so that the inlet of the PRV is located on an inside of the floating ball to communicate with the through hole of the floating ball and the internal cavity of the Bi-Flow valve. The PRV is positioned and, arbitrarily, oriented so that when Bi-Flow is closed the PRV faces the first fluid flow port of Bi-Flow and the allowed direction of the PRV is opposite to the direction of forward fluid flow through Bi-Flow.

Under normal operating conditions, as long as pressure inside the internal cavity of Bi-Flow remains below the cracking pressure of the PRV, irrespective of whether Bi-Flow is open or closed, the PRV remains closed. When Bi-Flow is closed to fluid flow, if pressure inside the internal cavity of Bi-Flow builds up to exceed the cracking pressure of the PRV, the PRV opens to release fluid from the internal cavity in a direction of the first Bi-Flow fluid flow port to reduce excess pressure and prevent damage to Bi-Flow. Bi-Flow may therefore advantageously be operated to block fluid flow through Bi-Flow in the forward direction up to a first pressure rating, also referred to as a forward or first pressure rating, of Bi-Flow, and up to a second pressure rating, also referred to as a backward pressure rating, of Bi-Flow optionally equal to the cracking pressure of the PRV for fluid flow in the backward direction. In an embodiment of the disclosure the forward and backward pressure ratings are substantially the same.

In an embodiment Bi-Flow comprises an additional PRV that operates similarly to the PRV noted above. The additional PRV is mounted to the floating ball and positioned and, oriented so that when Bi-Flow is closed the additional PRV faces the second fluid flow port of Bi-Flow and the allowed direction of the PRV is opposite to the direction of backward fluid flow through Bi-Flow.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF FIGURES

Non-limiting examples of embodiments of the disclosure are described below with reference to figures attached hereto that are listed following this paragraph. Identical features that appear in more than one figure are generally labeled with a same label in all the figures in which they appear. A label labeling an icon representing a given feature of an embodiment of the disclosure in a figure may be used to reference the given feature. Dimensions of features shown in the figures are chosen for convenience and clarity of presentation and are not necessarily shown to scale.

DETAILED DESCRIPTION

In the detailed description below, features of the construction of a firesafe Bi-Flow floating ball valve in accordance with an embodiment of the disclosure are discussed with reference to FIGS. 1A-2C. Details of configurations of components of a the Bi-Flow shown in FIGS. 1A-2C and sealing of the Bi-Flow for states in which the Bi-Flow is open to fluid flow and closed to fluid flow are discussed with reference to FIGS. 3A-3C.

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which the embodiment is intended. Wherever a general term in the disclosure is illustrated by reference to an example instance or a list of example instances, the instance or instances referred to, are by way of non-limiting example instances of the general term, and the general term is not intended to be limited to the specific example instance or instances referred to. The phrase "in an embodiment", whether or not associated with a permissive, such as "may", "optionally", or "by way of example", is used to introduce for consideration an example, but not necessarily a mandatory, configuration of possible embodiments of the disclosure. Unless otherwise indicated, the word "or" in the description and claims is considered to be the inclusive "or" rather than the exclusive or, and indicates at least one of, or any combination of more than one of items it conjoins.

Figures 1A, 1B:
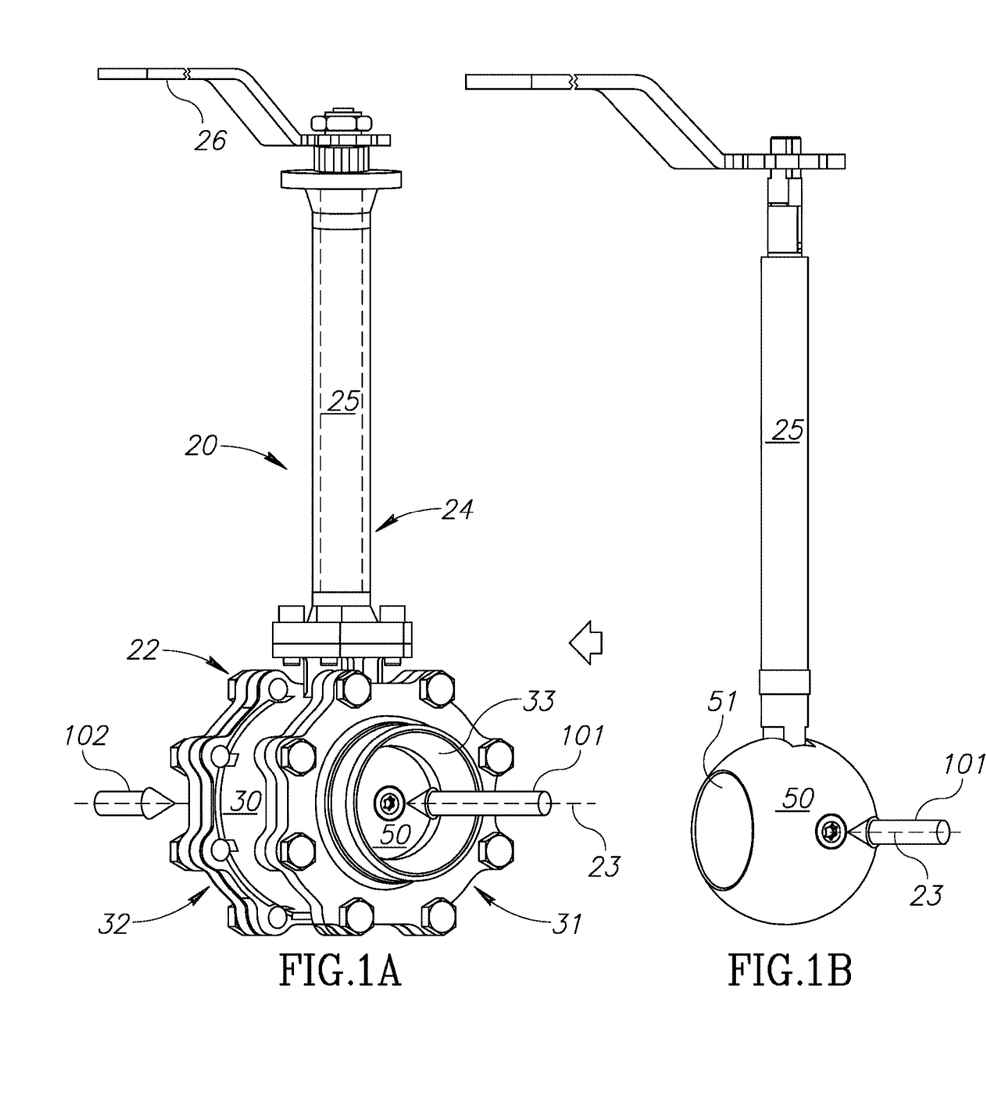
FIG. 1A schematically shows a perspective view of a Bi-Flow floating ball valve in a closed state and directions of flow of cryogenic fluid through the valve when the valve is open, in accordance with an embodiment of the disclosure.
FIGS. 1B and 1C schematically show perspective views of a floating ball in the Bi-Flow floating ball valve shown in FIG. 1A in closed and open orientations respectively that close and open Bi-Flow to fluid flow through the valve, in accordance with an embodiment of the disclosure.

FIG. 1A shows a perspective view of a Bi-Flow valve 20 that functions to control fluid flow through the valve selectively in either of two opposite directions, forward and backward directions, respectively indicated by cylindrical flow arrows 101 and 102, in accordance with an embodiment of the disclosure. In FIG. 1A, Bi-Flow 20 is shown closed to fluid flow.

Figure 3A:
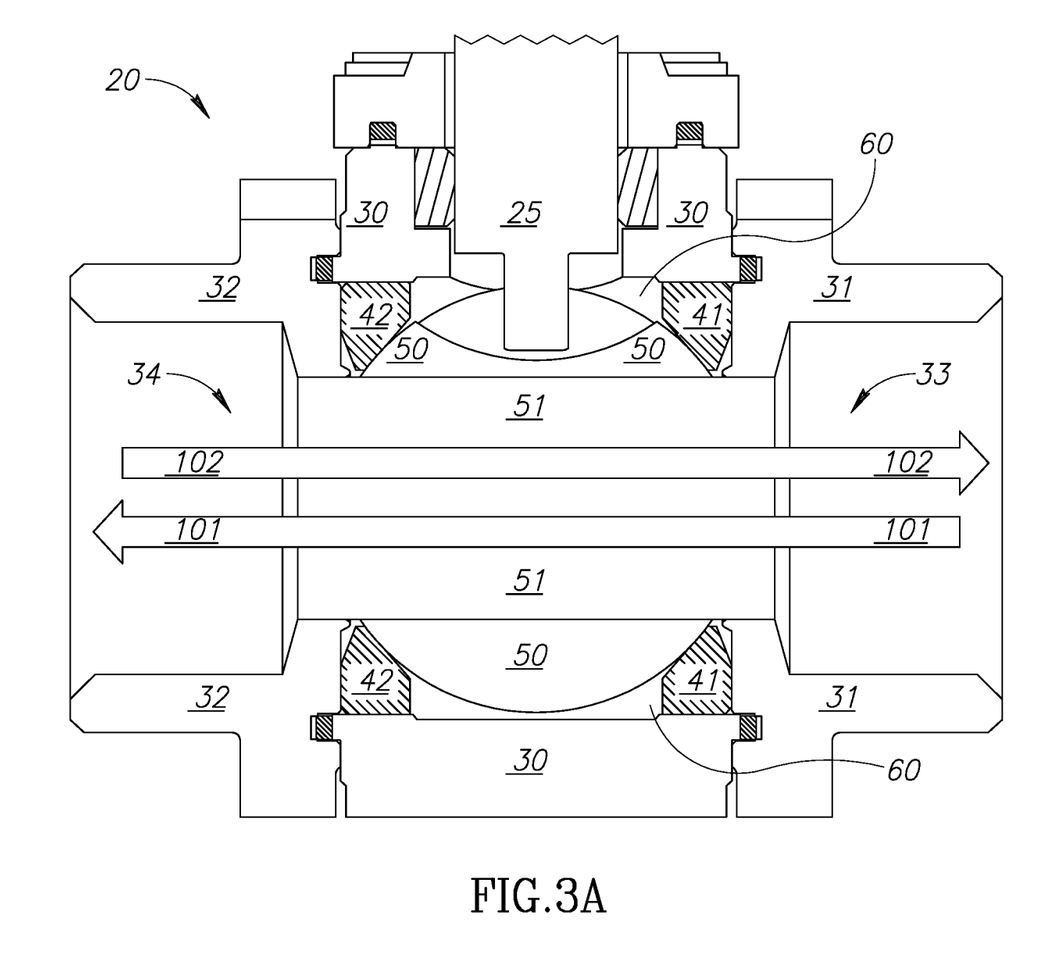
FIG. 3A schematically shows a cross section of the Bi-Flow when the Bi-Flow is open to enable fluid flow through the Bi-Flow in either forward or backward directions through the valve, in accordance with an embodiment of the disclosure.
Figure 3B:
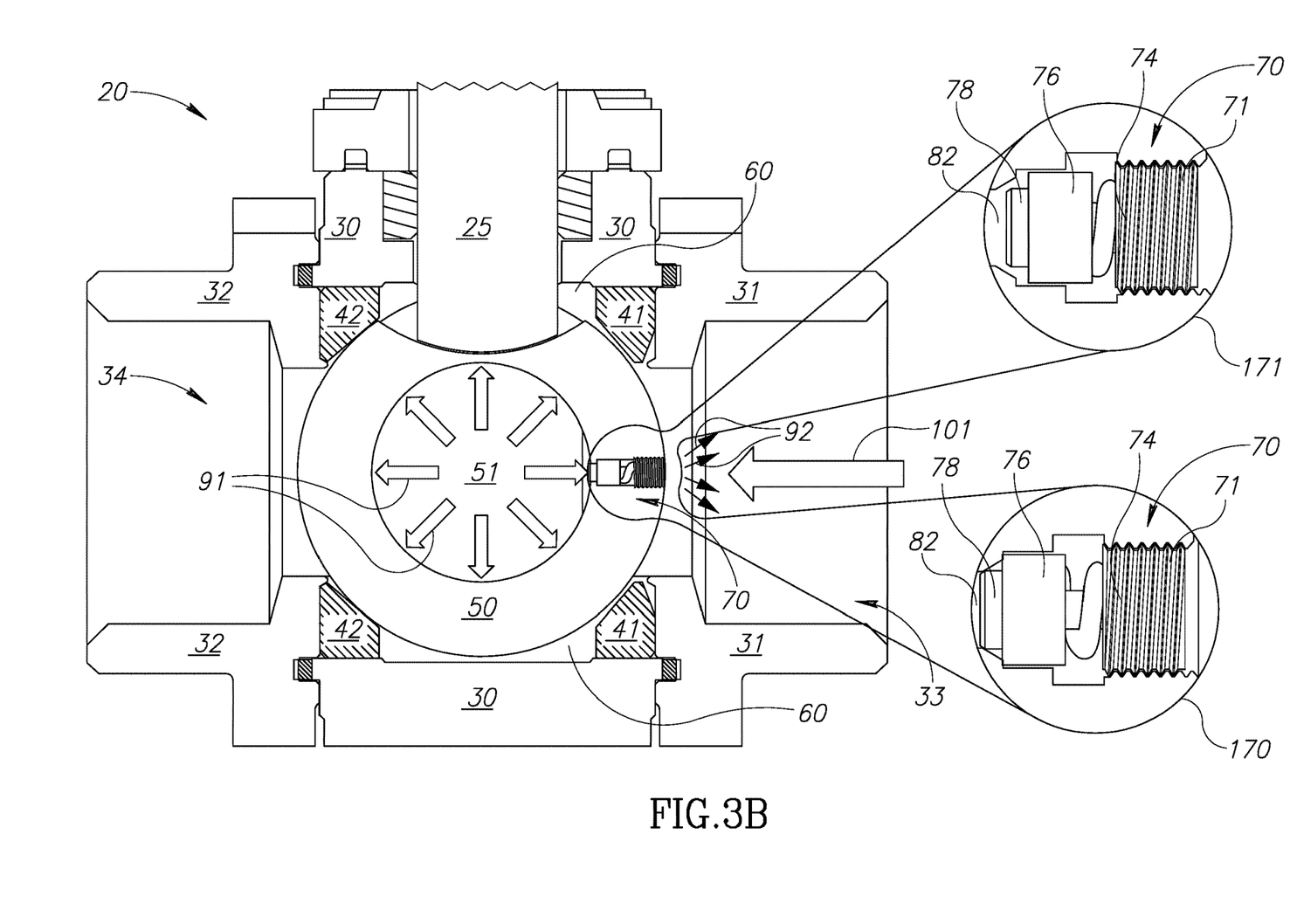
FIG. 3B schematically shows the Bi-Flow shown in FIG. 3A when the Bi-Flow is closed to fluid flow through the Bi-Flow for forward fluid flow through the Bi-Flow, in accordance with an embodiment of the disclosure.
Figure 3C:
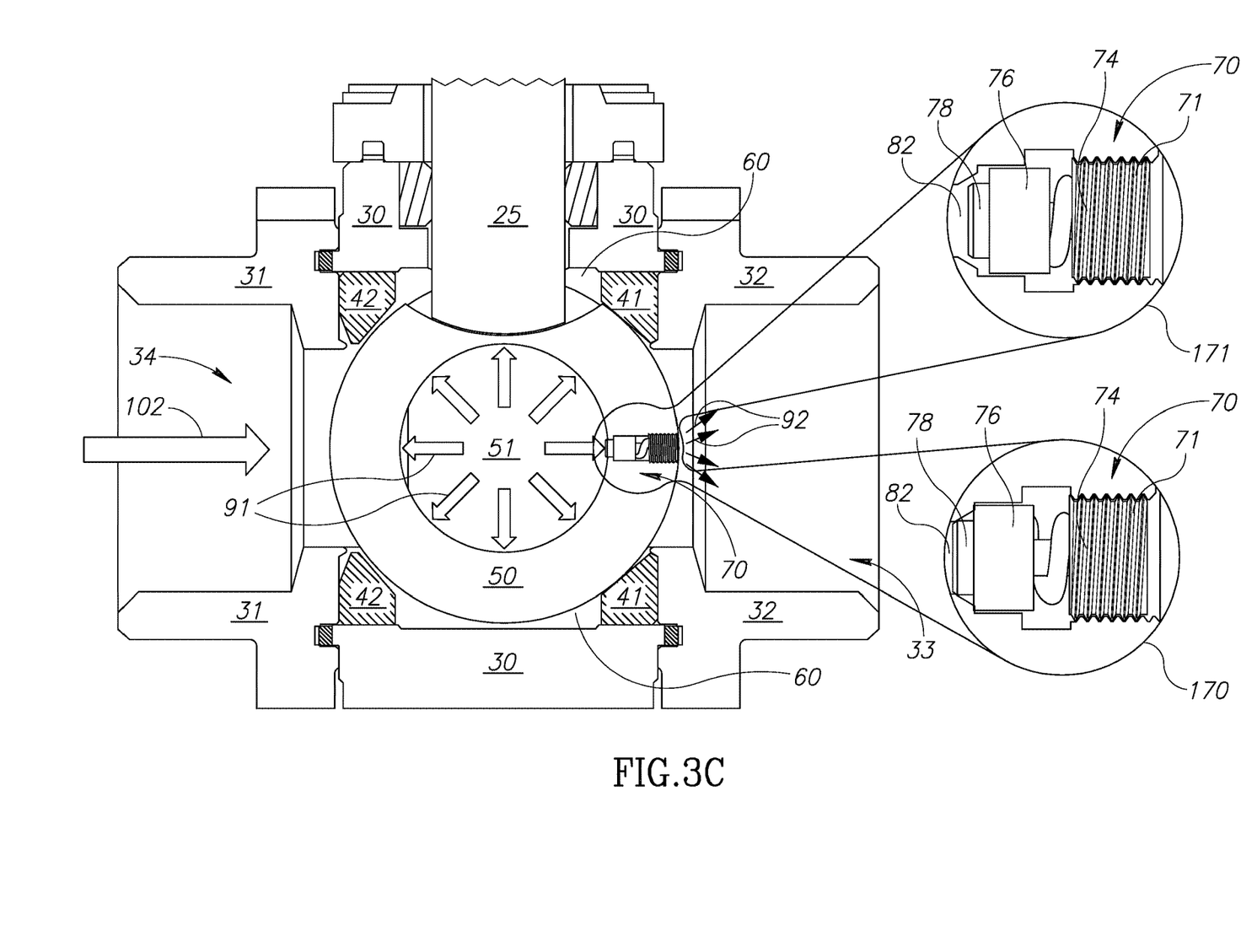
FIG. 3C schematically shows the Bi-Flow shown in FIG. 3A when the Bi-Flow is closed to fluid flow through the Bi-Flow for fluid flow through the Bi-Flow in the backward direction, in accordance with an embodiment of the disclosure.

Bi-Flow valve 20 optionally comprises a valve housing 22 having a central body 30 and first and second end caps 31 and 32 respectively that are coupled and sealed to the central body to close and seal the central body against fluid leakage. First and second end-caps 31 and 32 are formed having first and second fluid flow ports 33 and 34 respectively through which fluid carried by pipes (not shown) coupled to the fluid flow ports may enter to flow through housing 22 in forward direction 101 or backward direction 102 along an axis 23 of the housing. In the perspective of FIG. 1A only first fluid flow port 33 is shown. Second fluid flow port 34 is shown in FIGS. 3A-3C. A bonnet 24 coupled and sealed against fluid leakage from central body 22 extends from the central body and houses a stem 25 shown in dashed lines. The stem is coupled to a floating ball 50 housed in housing 22 and is attached to a handle 26. Operating handle 26 to rotate stem 25 through a quarter turn rotates floating ball 50 to open the valve to fluid flow or to close the valve to fluid flow through Bi-Flow 20. In accordance with an embodiment, floating ball 50 comprises a pressure relief valve, PRV 70, which when Bi-Flow is closed as shown in FIG. 1A faces first fluid flow port 33.

Figure 1C:
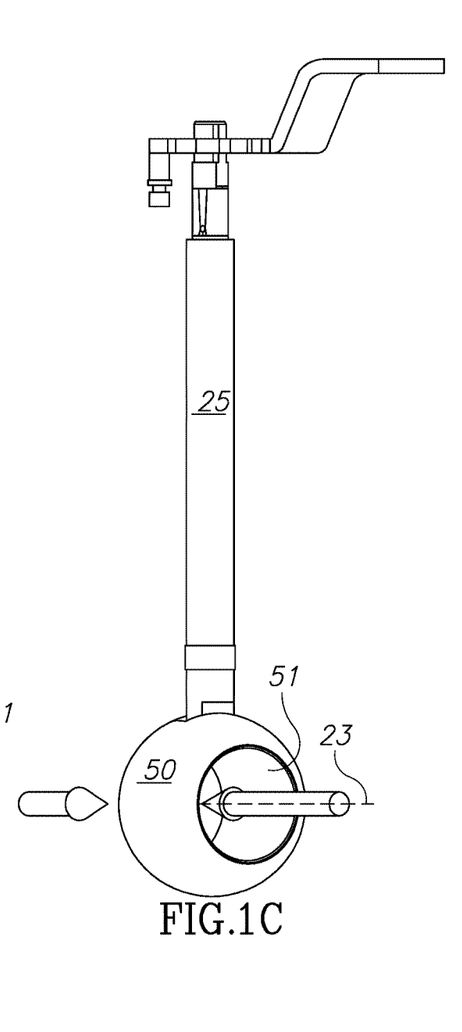

FIG. 1B schematically shows floating ball 50 rotated to orient a through hole 51 formed in floating ball 50 perpendicular to axis 23 and facing away from fluid flow ports 33 and 34 (FIGS. 3A-3C) to close Bi-Flow valve 20 and block fluid flow 101 and/or 102 through the valve. FIG. 1C schematically shows floating ball 50 rotated to orient through hole 51 parallel to axis 23 and facing fluid flow ports 33 and 34 to open Bi-Flow valve 20 and enable fluid flow through Bi-Flow.

Figures 2A, 2B, 2C:
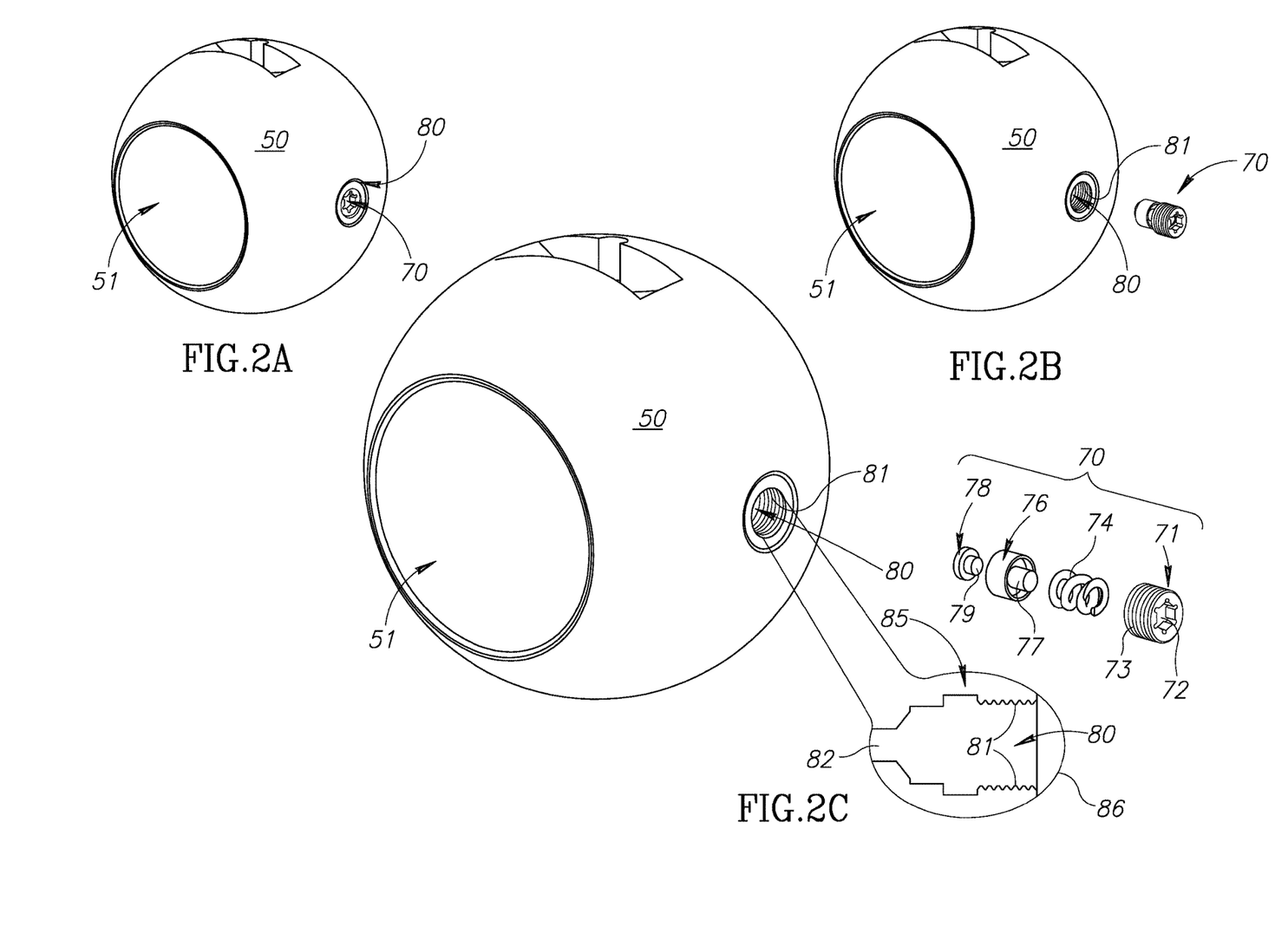
FIG. 2A schematically shows an enlarged perspective view of the floating ball in the Bi-Flow valve with a pressure relief valve (PRV) mounted to a PRV socket in the ball, in accordance with an embodiment of the disclosure.
FIG. 2B schematically shows the floating ball shown in FIG. 2A with the PRV removed from the socket, in accordance with an embodiment of the disclosure.
FIG. 2C schematically shows a perspective cutaway view of the floating ball and an exploded view of the PRV, in accordance with an embodiment of the disclosure.

FIG. 2A schematically shows an enlarged perspective view of floating ball 50 showing PRV 70, which is optionally seated in a threaded PRV socket 80 having threads 81 more clearly seen in detail in FIG. 2B and FIG. 2C. FIG. 2B schematically shows PRV 70 unscrewed and removed from threaded PRV socket 69. FIG. 2C shows an exploded view of PRV 70 and a cross section 85, shown in an inset 86 of PRV socket 80 that receives PRV 70. PRV 70 optionally comprises a threaded plug 71 formed having a through hole 72 and threads 73 that match threads 81 of PRV socket 80, an elastic member, optionally a compression coil spring 74, a piston 76 having a stem 77 that fits into a coil of compression spring 74, and an insert 78 having an insert stem 79 that seats in a recess (not shown) of piston 76. Socket 80 is formed having an orifice 82 (inset 86) that communicates with through hole 51 of floating ball 50. The socket has a cross section 85 shown in an inset 86 and is shaped and dimensioned so that insert 78, piston 76, and coil spring 74 may be inserted by sliding into the socket. Shape of the socket in a region of orifice 82 is configured to prevent insert 78 from being pushed out through orifice 82 into through hole 51 of floating ball 50. A cross section view PRV 70 seated in PRV socket 80 is schematically shown closed and open to fluid flow in inset 170 and 171 respectively of FIGS. 3B and 3C. Operation of PRV 70, in accordance with an embodiment of the disclosure is discussed below with reference to the figures.

FIG. 3A schematically shows a cross section view of Bi-Flow valve 20 when the valve is open and ball 50 is rotated to enable fluid flow in forward and backward directions, schematically indicated by block arrows 101 and 102 respectively, between first fluid flow port 33 and second fluid flow port 34. Floating ball 50 is housed inside an internal cavity 60 of housing 22 and is firmly held between seats 41 and 42 which seal the floating ball to inlet and outlet endcaps 31 and 32 respectively and central body 30 of the housing.

FIG. 3B schematically shows a cross section view of Bi-Flow valve 20 being used to control cryogenic fluid flow in the forward direction 101 from a source (not shown) of cryogenic fluid that enters Bi-Flow via first fluid flow port 33 to flow through Bi-Flow, in accordance with an embodiment of the disclosure. Bi-Flow 20 is shown after having been closed to fluid flow from an open state shown in FIG. 3A. In the closed state floating ball 50 is rotated to block flow of fluid entering Bi-Flow 20 from first fluid flow port 33 from flowing downstream through Bi-Flow. Pressure applied to floating ball 50 by the fluid from the source that is blocked displaces floating ball 50 downstream in the direction of block arrow 101 away from seal 41. The downstream pressure increases force with which the floating ball presses on seat 42 and strengthens sealing of floating ball 50 to seat 42, the seat to endcap 32 and central body 30, and completes sealing Bi-Flow to forward fluid flow.

In the closed state of Bi-Flow 20, PRV 70 faces first fluid flow port 33 and is normally closed to prevent fluid trapped in cavity 60 and through hole 51 from flowing through the PRV upstream to first fluid flow port 33 and towards the source of cryogenic fluid. As noted above, inset 170 schematically shows PRV 70 closed to fluid flow.

In being closed from the open state Bi-Flow valve 20 may trap a quantity of cryogenic fluid in cavity 60 of housing 22 and through hole 51 in floating ball 50. In the event that the trapped cryogenic fluid evaporates to generate internal pressure in housing 22 exceeding the cracking pressure of PRV 70, PRV 70 opens to release fluid from the housing cavity upstream, in a direction of first fluid flow port 33, opposite the forward flow direction indicated by arrow 101. The release of fluid and concomitant relief of pressure in hosing 22 is indicated by the bouquet of arrows 92 and operates to prevent overpressure in housing 22 from damaging Bi-Flow valve 20. Inset 171 schematically shows PRV 70 open to fluid flow from cavity 20 and through hole 51 to inlet port 33.

FIG. 3C schematically shows a cross section view of Bi-Flow valve 20 being used to control cryogenic fluid flow in the backward direction 102, opposite to direction 101 shown in FIG. 3B, from a source (not shown) of cryogenic fluid that enters Bi-Flow 20 via second fluid flow port 34 rather than first fluid flow port 33 to flow through Bi-Flow, in accordance with an embodiment of the disclosure. Bi-Flow 20 is shown after having been closed to fluid flow from an open state shown in FIG. 3A. Similar to the case shown in FIG. 3C, in the closed state, floating ball is rotated to block fluid from the source entering Bi-Flow 20 via second fluid flow port 34 from flowing through Bi-Flow. Pressure from the blocked fluid displaces floating ball 50 downstream, in the direction of block arrow 102 opposite to direction 101 (FIG. 3B). (Note that downstream direction in FIG. 3C is opposite that in FIG. 3B). The downstream pressure displaces floating ball 50 away from seat 42 to increase force with which the floating ball presses on seat 41 and thereby to strengthen sealing of floating ball 50 to seat 41, the seat to endcap 32 and central body 30, and complete sealing Bi-Flow to backward fluid flow.

For pressure generated by blocked fluid on floating ball 50 in the direction 102 that is less than the cracking pressure of PRV 70, PRV 70 remains closed and Bi-Flow remains sealed against flow in the backward direction. For pressure generated by evaporation of fluid trapped in housing 22 greater than the cracking pressure, PRV 70 opens and breaks the seal of Bi-Flow 20 against backward fluid flow. And, similarly to the case for forward flow, in the event that trapped cryogenic fluid evaporates to generate internal pressure in housing 22 exceeding the cracking pressure of PRV 70, PRV 70 opens to release fluid from the housing cavity in the direction of first fluid flow port 33. However, it is noted that for the case of backward motion, release in the direction of first fluid flow port 33 is release in the downstream direction for backward flow.

Figure 3D:
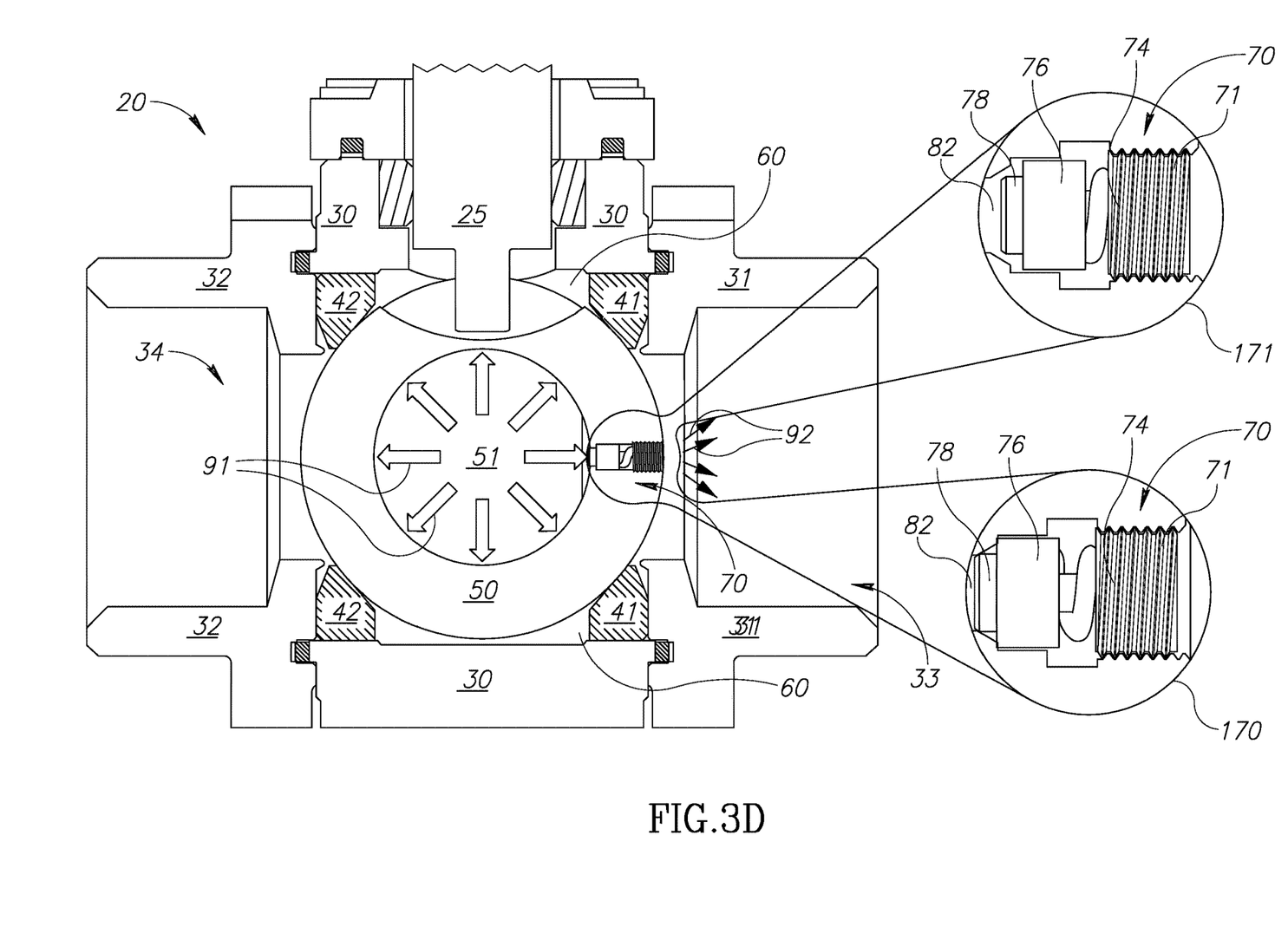
FIG. 3D schematically shows the Bi-Flow shown in FIG. 3A when Bi-Flow 20 is closed and there is no pressure differential generated on floating ball 50 by pressure from blocked fluid in the forward or backward directions.

FIG. 3D schematically shows the Bi-Flow shown in FIG. 3A when Bi-Flow 20 is closed and there is no pressure differential generated on floating ball 50 by pressure from blocked fluid in the forward or backward directions. As a result there are no forces displacing floating ball 50 downstream to seal to one or the other of seats 41 or 42, and the floating ball therefore seals to both seat 41 and 42 and seals internal cavity 60 and through hole 51 from first and second fluid flow ports 33 and 34. If in the closed state shown in FIG. 3D there is cryogenic fluid trapped in sealed internal cavity 60 that evaporates to generate internal pressure in housing 22 exceeding the cracking pressure of PRV 70, PRV 70 opens, as schematically indicated in the figure, to release fluid from the housing in the direction of first fluid flow port 33 and relieve the excess pressure.

By way of a numerical example, a Bi-Flow valve in accordance with an embodiment of the disclosure, similar to Bi-Flow vale 20, may comprise a floating ball have a diameter between about ½ inch (½"), Nominal Pipe Size (NPS) ½" and about 8 inches (NPS 8"), or in terms of the international DN standard, between about DN15 (diametre nominal 15 mm (millimeters) and DN200. The Bi-Flow may comprise a pressure relief valve having a cracking pressure, and optionally a same forward and backward pressure rating between about pressure number PN20 (Class #150) and about PN400 (Class #2500).

It is noted that the above detailed description and figures detail features of a Bi-Flow valve comprising a single PRV in accordance with an embodiment of the disclosure. However, a Bi-Flow in accordance with an embodiment of the disclosure may have more than one PRV. For example, a Bi-Flow may have two optionally mirror image PRVs that face in opposite directions.

There is therefore provided in accordance with an embodiment of the disclosure a floating ball valve comprising: a housing having an internal cavity and first and second fluid flow ports through which fluid flows selectively in either direction from the first to the second or the second to the first fluid flow ports when the valve is open; a floating ball housed in the cavity and formed having a through hole for passage of fluid the ball being rotatable to open the valve and allow fluid flow through the fluid flow ports and internal cavity and to close the valve and block fluid flow through the fluid flow ports and cavity; and a pressure relief valve (PRV) having a cracking pressure mounted to the floating ball so that the PRV communicates with the through hole, and when the floating ball valve is closed the PRV faces and communicates with the first fluid flow port; wherein the floating ball valve is characterized by a first pressure rating for fluid flow from the first to the second fluid flow ports and a second pressure rating for fluid flow from the second to the first fluid flow ports and wherein the PRV is normally closed whether the floating ball valve is open or closed, and when the floating ball valve is closed, if pressure generated by fluid inside the internal cavity exceeds the cracking pressure of the PRV, the PRV opens to release at least a portion of the fluid inside the floating ball valve towards the first fluid flow port to relieve the pressure.

Optionally, the floating ball is formed having a threaded socket that communicates with the through hole of the floating ball via an orifice, and into which socket the PRV is seated to mount the PRV to the floating ball. Optionally, the PRV comprises a threaded plug which is screwed into the socket to mount the PRV to the floating ball. Additionally or alternatively the PRV may comprise a piston and a resilient element that applies resilient force to the piston to maintain the orifice and thereby the PRV closed.

In an embodiment the cracking pressure of the PRV is substantially equal to or greater than the second pressure rating of the floating ball valve.

In an embodiment the floating ball valve may comprise an additional PRV having a cracking pressure mounted to the floating ball so that the additional PRV communicates with the through hole, and when the floating ball valve is closed the additional PRV faces and communicates with the second fluid flow port; wherein the additional PRV is normally closed whether the floating ball valve is open or closed, and when the floating ball valve is closed, if pressure generated by fluid inside the internal cavity exceeds the cracking pressure of the additional PRV, the additional PRV opens to release at least a portion of the fluid inside the floating ball valve towards the second fluid flow port to relieve the pressure. Optionally, the cracking pressure of the additional PRV is substantially equal to or greater than the first pressure rating of the floating ball.

In an embodiment the first pressure rating is between about PN20 to about PN400. In an embodiment the second pressure rating is between about PN20 to about PN400. In an embodiment the first and second pressure ratings are substantially the same. In an embodiment the floating ball has a diameter between about ½ inch and about 8 inches.

There is further provided a floating ball valve adapted to function as a firesafe cryogenic floating ball valve in accordance with an embodiment of the disclosure.

In the description and claims of the present application, each of the verbs, "comprise" "include" and "have", and conjugates thereof, are used to indicate that the object or objects of the verb are not necessarily a complete listing of components, elements or parts of the subject or subjects of the verb.

Descriptions of embodiments of the disclosure in the present application are provided by way of example and are not intended to limit the scope of the disclosure. The described embodiments comprise different features, not all of which are required in all embodiments of the disclosure. Some embodiments utilize only some of the features or possible combinations of the features. Variations of embodiments of the disclosure that are described, and embodiments of the disclosure comprising different combinations of features noted in the described embodiments, will occur to persons of the art. The scope of the disclosure is limited only by the claims.

The invention claimed is:

1. A floating ball valve comprising:
   a housing having an internal cavity and first and second fluid flow ports through which fluid flows selectively in either direction from the first to the second or the second to the first fluid flow ports when the valve is open;
   a floating ball housed in the cavity and formed having a through hole for passage of fluid the ball being rotatable to open the valve and allow fluid flow through the fluid flow ports and internal cavity and to close the valve and block fluid flow through the fluid flow ports and cavity; and
   a pressure relief valve (PRV) having a cracking pressure mounted to the floating ball so that the PRV communicates with the through hole, and when the floating ball valve is closed the PRV faces and communicates with the first fluid flow port;
   wherein the floating ball valve is characterized by a first pressure rating for fluid flow from the first to the second fluid flow ports and a second pressure rating for fluid flow from the second to the first fluid flow ports and wherein the PRV is normally closed whether the floating ball valve is open or closed, and when the floating ball valve is closed, if pressure generated by fluid inside the internal cavity exceeds the cracking pressure of the PRV, the PRV opens to release at least a portion of the fluid inside the floating ball valve towards the first fluid flow port to relieve the pressure;
   wherein the floating ball is formed having a socket that communicates with the through hole of the floating ball via an orifice, said orifice comprising an inner conical surface;
   wherein the PRV comprises a plug which is coupled to the socket to mount the PRV to the floating ball;
   wherein the PRV comprises a piston biased by a resilient element that applies a force to urge the piston towards the orifice; and
   wherein an insert is coupled to said piston, said insert comprising a face formed with a chamfer inclined to match an inclination of said inner conical surface, wherein said chamfer is configured to sealingly abut against said inner conical surface.

2. The floating ball valve according to claim 1 wherein said socket comprises a threaded portion.

3. The floating ball valve according to claim 2 wherein said plug comprises a threaded plug which is screwed into said threaded portion.

4. The floating ball valve according to claim 2 wherein said socket is shaped in a region of said orifice to prevent said insert from being pushed out through said orifice into said through hole of said floating ball.

5. The floating ball valve according to claim 1 wherein the cracking pressure of the PRV is substantially equal to or greater than the second pressure rating of the floating ball valve.

6. The floating ball valve according to claim 1 and comprising an additional PRV having a cracking pressure mounted to the floating ball so that the additional PRV communicates with the through hole, and when the floating ball valve is closed the additional PRV faces and communicates with the second fluid flow port; wherein the additional PRV is normally closed whether the floating ball valve is open or closed, and when the floating ball valve is closed, if pressure generated by fluid inside the internal cavity exceeds the cracking pressure of the additional PRV, the additional PRV opens to release at least a portion of the fluid inside the floating ball valve towards the second fluid flow port to relieve the pressure.

7. The floating ball valve according to claim 6 wherein the cracking pressure of the additional PRV is substantially equal to or greater than the first pressure rating of the floating ball.

8. The floating ball valve according to claim 1 wherein the first pressure rating is between about PN20 to about PN400.

9. The floating ball valve according to claim 1 wherein the second pressure rating is between about PN20 to about PN400.

10. The floating ball valve according to claim 1 wherein the first and second pressure ratings are substantially the same.

11. The floating ball valve according to claim 1 wherein the floating ball has a diameter between about ½ inch and about 8 inches.

12. The floating ball valve according to claim 1 wherein said floating ball valve comprises a firesafe cryogenic floating ball valve.

\* \* \* \* \*